April 18, 1950　　　　B. D. KAHAN　　　　2,504,532
CALCULATING DEVICE
Filed July 26, 1946　　　　　　　　　　2 Sheets-Sheet 1
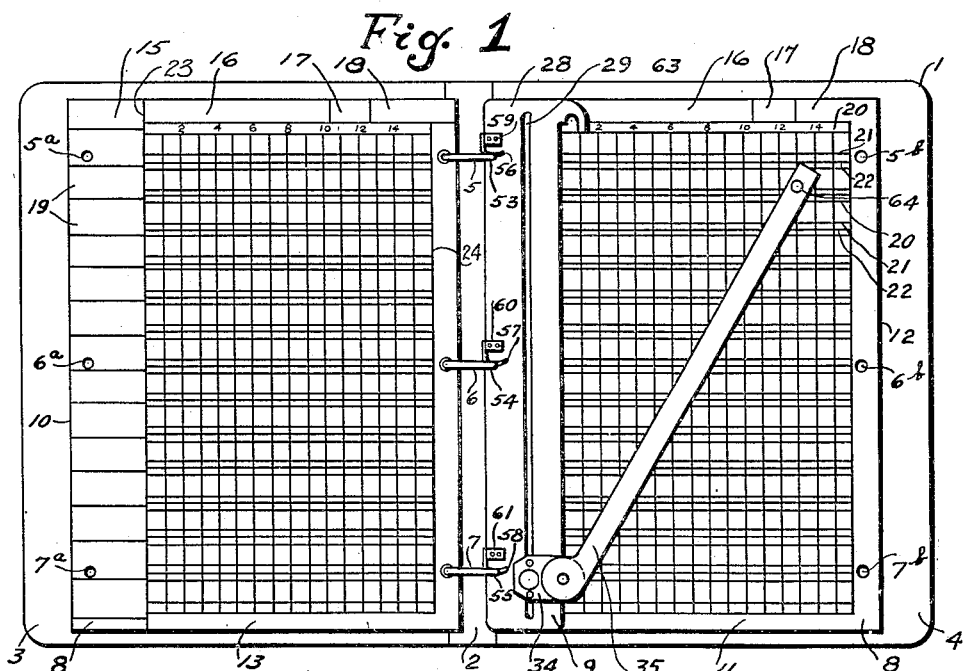
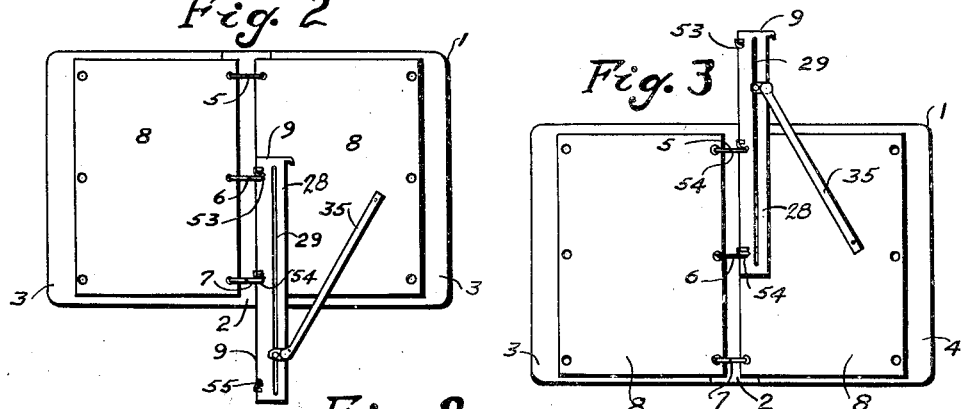
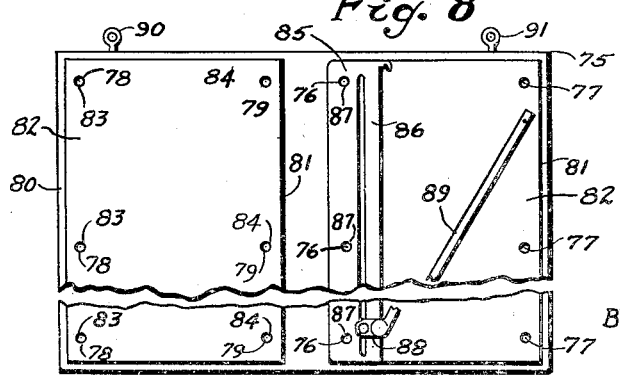
INVENTOR.
BENEDICT D. KAHAN
BY
ATTORNEY April 18, 1950  B. D. KAHAN  2,504,532
CALCULATING DEVICE
Filed July 26, 1946  2 Sheets-Sheet 2
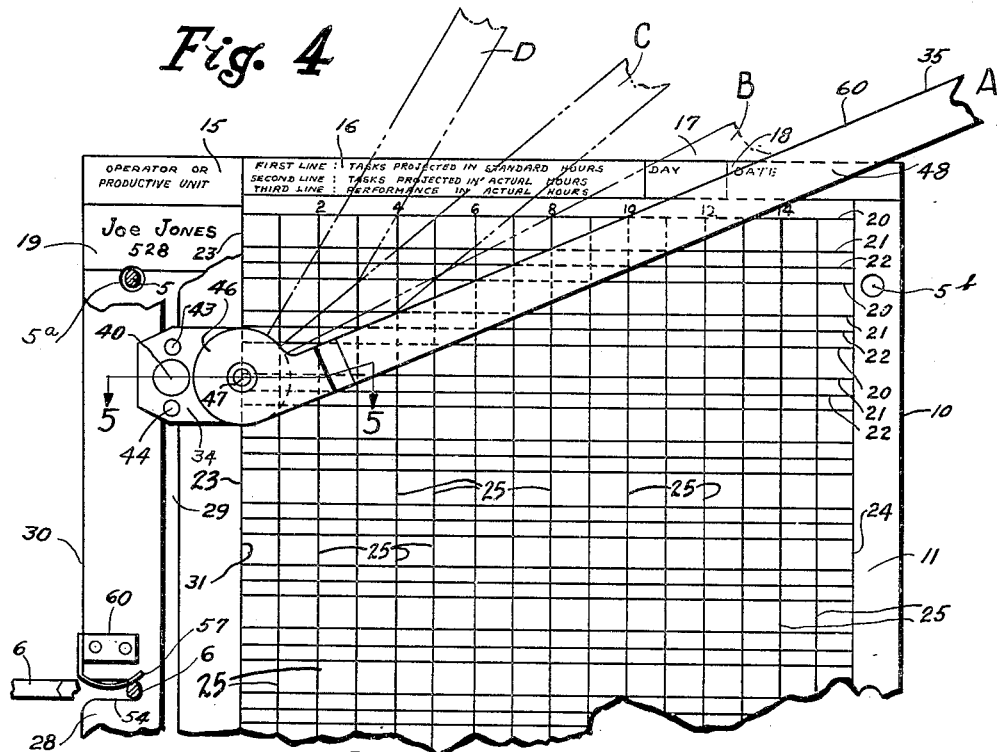
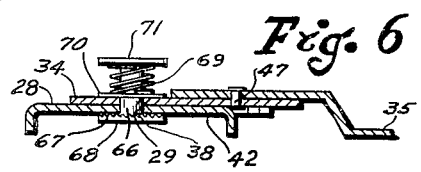
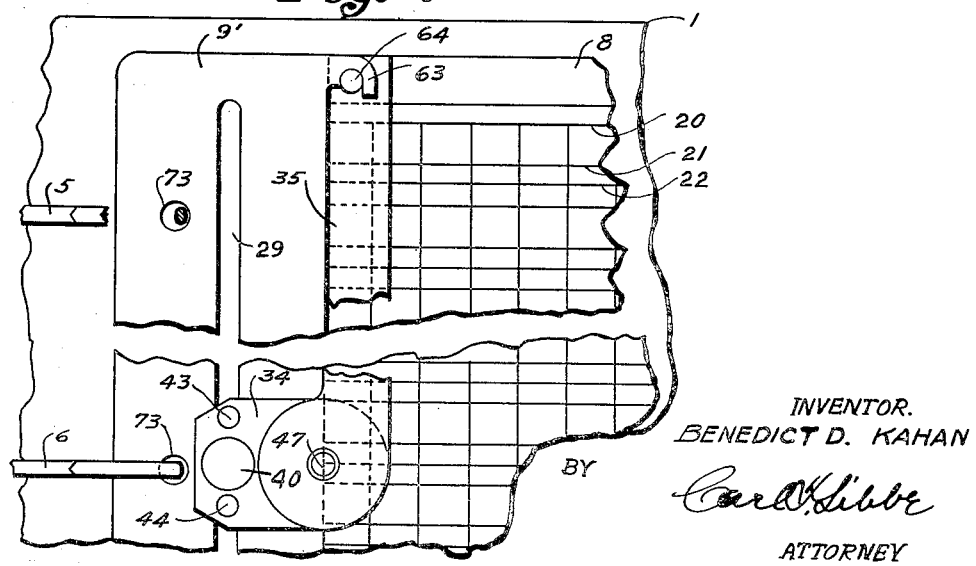
INVENTOR.
BENEDICT D. KAHAN
BY
ATTORNEY Patented Apr. 18, 1950

2,504,532

UNITED STATES PATENT OFFICE 2,504,532

CALCULATING DEVICE

Benedict D. Kahan, Philadelphia, Pa.

Application July 26, 1946, Serial No. 686,405

8 Claims. (Cl. 235—89)

This invention relates to calculating devices, and more particularly to manually operable devices which enable comparative calculations to be rapidly made mechanically.

In manufacturing or jobbing shops, especially those that assign work to the various employees therein which varies in nature and in the time required for completion, considerable time is lost because of the difficulty encountered in keeping track of the work assigned to each employee and the degree of completion of such tasks during the work period. In certain types of work, such, for example, as repair work for automobiles, standards have been set up of the average time required to complete each task. The estimated charges made for such tasks are based upon the length of time to complete them and on the materials required in connection therewith. If all the employees were equally proficient, the task of the foreman would be somewhat simplified, but, of course, that is not the case. Some of the employees are able to produce more than the average amount of work, while others produce less.

The present invention contemplates devices which enable the foreman to keep a running record of the progress of the work assigned to and performed by each employee under his supervision. The devices, moreover, enable the foreman to ascertain, without mathematical calculation, the ratio between the standard hours projected for any work and the actual hours projected therefor at any time during the work period for each employee. This enables the foreman to readily determine the progress made in connection with each task assigned so that new tasks may be assigned without delay. The foreman may also readily determine to which of his employees certain new tasks should be assigned. For example, should a task that must be completed at a certain time require two hours of work, the foreman may readily determine which of his employees is best able to perform that task without interrupting or delaying work that he is currently performing. By consulting his chart and mechanically calculating the time at which each employee will complete the tasks already assigned, new tasks are assigned without delay, and accordingly the time lost between assignments of tasks is reduced to a minimum.

The invention is also adapted for other uses wherein it is desired to determine, without mathematical computation, the ratio between comparative items projected on parallel lines between certain limits. An example of such further use is in connection with two or more ships sailing on parallel courses, but which travel at different rates of speed. The present invention enables the determination of the relative positions of the ships at any particular time.

One object is to provide a chart having groups of parallel lines thereon, on which may be projected the comparative items under consideration.

Another object is to provide in association with a chart of the stated character an adjustable mechanical device which enables determination, without mathematical calculation, of the relation or ratio between the items projected on the parallel lines of said chart at any point along the lengths thereof.

Another object is to provide means for facilitating the work of a foreman, including control sheets on which each employee may be listed, the tasks assigned projected in standard hours, the tasks projected in actual hours, and the performance of the tasks assigned in the actual hours consumed being indicated respectively on parallel lines opposite the name of each employee or production unit. The foreman thus has a continuous daily record and can readily determine the progress made by each employee or production unit.

Another object is to provide a mechanical device, operable with control sheets of the class described, which enables the foreman to determine, without making mathematical calculations, the ratio between the projected standard hours for a task and the actual hours projected for the task with respect to each employee listed at any time during a work period.

A more specific object is to provide control sheets of the character described, having groups of parallel lines provided thereon, and an arm pivotally mounted on a bracket, which is adapted for slidable movement lengthwise of said control sheets, whereby said arm may be brought into operative position with respect to a number of the groups of lines provided thereon.

A further object is to provide a calculating unit comprising a base member and a bracket slidable lengthwise of said base member having an arm pivotally mounted thereon.

A still further object is to provide a calculating unit adapted to be detachably mounted in a ring binder containing control sheets of the character described, said unit being adapted to be positioned beyond the extremities of said binder, whereby the pivoted arm associated therewith may be brought into operative relation with respect to all the groups of lines on the said sheets.

A still further object is to provide control sheets of the character described, having a plurality of groups of parallel lines thereon, said sheets having holes provided along each side margin thereof, enabling said sheets to be fastened to the rings of a binder, or to the posts of a drawing or display board, at either margin, whereby two sheets may assume a side by side position in said binder, or on said drawing board, for comparison of the data indicated on two of said sheets or for providing a visible record of data continued on the second sheet.

A still further object resides in certain improved details of construction of the improved mechanical calculating device.

Other and further objects will become apparent as the description of the invention progresses.

Of the drawings:

Fig. 1 is a plan view of a ring binder showing the invention attached thereto, the calculating device being arranged in normal position.

Fig. 2 is a similar reduced plan view showing the calculating device arranged so that a portion thereof extends beyond the lower edge of the binder.

Fig. 3 is a similar reduced plan view showing the calculating device arranged so that a portion thereof extends beyond the upper edge of the binder.

Fig. 4 is an enlarged plan view of a portion of the device illustrating the operation thereof.

Fig. 5 is a sectional view taken substantially along line 5—5 of Fig. 4.

Fig. 6 is a similar sectional view of a modified construction.

Fig. 7 is a fragmentary plan view of a modified embodiment of the invention; and Fig. 8 is a plan view of a further embodiment showing the invention applied to a flat board.

Referring to the drawings, and more particularly to Figs. 1 to 4, the numeral 1 indicates a binder comprising an end backing portion 2 and front and back covers 3 and 4 respectively. Three split rings 5, 6 and 7, of usual construction, are provided in backing portion 2. Control sheets 8 and a calculating device, indicated generally at 9, are adapted for attachment to the rings 5, 6 and 7 of the binder 1. Three spaced holes 5ª, 6ª and 7ª are provided near the left hand edge 10 of each sheet 8 to enable attachment of the latter to the rings 5, 6 and 7, so as to assume the position shown at 11 in Fig. 1. Three similarly spaced holes 5ᵇ, 6ᵇ and 7ᵇ are provided near the right hand edge 12 of each control sheet 8 to enable attachment thereof to the rings 5, 6 and 7, as shown at 13 in Fig. 1, when it is desired to compare the data on one control sheet with that on another.

Each control sheet 8 has provided near the upper edge thereof four spaces, 15, 16, 17 and 18, in which may be inserted, respectively, a heading for the spaces 19, certain descriptive matter for certain lines on the said control sheets, the day of the week, and the date. Each of the spaces 19 may have inserted therein the name and number of an employee when the device is used for industrial purposes, as shown in Fig. 4. Opposite each space 19 are three horizontal lines 20, 21 and 22, which extend across the sheet between the left and right hand margin lines 23 and 24 respectively. The top line 20 of each group of horizontal lines may have marked thereon, when the invention is used for industrial purposes, tasks projected in standard hours. The second line 21 of each group may have marked thereon tasks projected in actual hours, while the third line 22 in each group may have marked thereon performance in actual hours.

The space between margin lines 23 and 24 is divided by vertical lines 25 into sixteen equal spaces, each space, when the invention is used for industrial purposes, representing one hour. Alternate lines 25 are marked by the hours indicated thereby, as shown in Fig. 4.

It is a well known practise of production engineers to tabulate the average number of hours in which an operator, worker, or machine working or functioning under standardized conditions, will be able to complete each of the various jobs or units of work under their supervision or control. Allowances for fatigue and any and all other factors are considered in determining the normal time consumed in completing a given task. The time thus determined for a given task is known as standard time or the standard hours for the said task.

The actual hours required to complete the tasks assigned to the employees are thus marked on lines 21 on control sheets 8. Some employees are more proficient than others and the foreman by his experience soon classifies them according to their respective abilities. One employee, for example, may be able to do ten standard hours of work in eight hours, according to the job ratings in effect. Accordingly, such an employee would be classified as a standard "ten-hour" man, and ten hours would be marked on line 20 opposite his name. In other words, such an employee's rating would be two hours in excess of the standard eight hour work day and he would be so classified when estimating the tasks to be performed during the work period. The actual time in hours consumed by such employee for the tasks assigned is marked on line 22 opposite his name. Thus, when the tasks have been completed, the foreman or superintendent has a complete record of the performance of each employee.

It is also seen that some employees may be below the average in proficiency, and accordingly they may not be able to perform the requisite amount of work projected in lines 20 opposite their names. Such employees may only be able to perform, for example, six standard hours of work in an eight hour period, and accordingly their ratings would be two hours less than the standard time assigned for the tasks involved. Lines 20 opposite their names would be so marked, lines 21 would indicate the tasks projected in actual hours, and the actual time consumed for the tasks assigned would be marked in lines 22, as in the previous case when the tasks have been completed. By comparing the markings in lines 20, 21 and 22 opposite each employee listed on control sheets 8 from day to day, the foreman may observe the progress made by each employee and proceed accordingly. The foreman will soon discover which employees are suited or unsuited for certain tasks and he then may make the necessary adjustments to improve the efficiency of his department. Most workers improve over a period of time and accordingly their ratings would change correspondingly. As these changes in proficiency occur, the tasks projected in lines 20 for such employees will be correspondingly increased.

Lines 20 may have projected thereon the standard hours for tasks requiring relatively long periods of work or two or more tasks requiring shorter periods of work. For example, in an eight-hour day two tasks requiring four hours each, four tasks requiring two hours each, eight tasks requiring one hour each, or any other number of tasks may be indicated on lines 20 of the control sheets 8. The foreman by inspecting the control sheets thus not only has a complete visual record of all the tasks assigned but also a record of the relative abilities of each of his employees adjacent the tasks assigned to them.

In order to enable the foreman to directly ascertain, without mathematical calculation, the degree of completion of each task assigned to each employee at any time during the work period or to estimate the time of completion of the various tasks assigned to the various employees, the mechanical calculating device 9 has been provided. By the use of calculating device 9 in connection with the control sheets 8, these results may be quickly and accurately ascertained. The foreman is thus in a position to assign new tasks to the proper employees and to fit in tasks which must be finished during a work period in such a manner so as to interfere as little as possible with production as a whole.

Referring more particularly to Figs. 1, 4 and 5, calculating device 9 comprises an elongated base member 28, having a relatively narrow slot 29 extending lengthwise thereof. The side edges 30 and 31 of base member 28 are bent downwardly, forming a pair of relatively short supporting legs 32 and 33. A bracket 34 having a relatively long calculating arm 35 pivotally mounted thereon is slidable on the upper surface 36 of base member 28. Bracket 34 is secured to base member 28 by a stud bolt 37. As shown in Fig. 5, the bolt 37 extends upwardly through slot 29 in base member 28 and an aperture 38 provided in bracket 34 and the upper threaded end 39 thereof has secured thereto a knurled nut 40. The head 41 of bolt 37 lies within the confines of legs 32 and 33 of base member 28 and engages the under surface 42 of the latter. Thus by first loosening nut 40, bracket 34 may be manually moved along base member 28 to any desired position of adjustment. Bracket 34 is held in adjusted position by simply tightening nut 40. It is seen that since the head 41 of bolt 37 lies within the confines of legs 32 and 33 of base member 28, it will not engage the sheets 8 therebeneath. Free movement of bracket 34, therefore, is permitted when nut 40 is loosened.

In order to maintain bracket 34 in a horizontal position and to prevent turning thereof about bolt 37 when nut 40 is loosened, a pair of studs 43 and 44 are provided on bracket 34. Studs 43 and 44 depend from bracket 34 at opposite sides of bolt 37 and extend into the slot 29 in base member 28.

As shown more particularly in Figs. 4 and 5, the enlarged rounded end 46 of calculating arm 35 is pivotally mounted on a headed stud 47 secured to and extending upwardly from bracket 34. The main portion 48 of arm 35 is offset from the rounded portion so that the under surface 49 thereof lies in substantially the same plane as the bottom edges 50 and 51 of legs 32 and 33 respectively of base member 28. The lower surface 49 of the main portion 48 of arm 35 therefore lies in abutting relation with the control sheet 8 immediately therebeneath.

Calculating device 9 is adapted for ready attachment to or detachment from the rings 5, 6 and 7 of binder 1. As shown in Figs. 1 and 4, base member 28 has provided along the left hand edge 30 thereof three inwardly extending slots 53, 54 and 55, which are so spaced as to register with rings 5, 6 and 7 respectively of binder 1. Spring arms 56, 57 and 58 mounted respectively on brackets 59, 60 and 61 secured to base member 28 extend across slots 53, 54 and 55. Thus to secure the calculating device 9 to binder 1, the base member 28 is so adjusted as to cause the slots 53, 54 and 55 to register respectively with the rings 5, 6 and 7. Base member 28 is then moved to the left (Figs. 1 and 4) against the action of springs 56, 57 and 58 until the said rings engage the inner ends of said slots. The springs 56, 57 and 58 engaging the rings 5, 6 and 7 respectively, as shown in Figs. 1 and 4, resiliently hold the base member 28 in position.

When the base member 28 has been attached to the binder 1, as just described, the right hand edge 31 thereof coincides with the margin line 23 on control sheet 8. Upon reference particularly to Fig. 4, it is seen that the pivotal axis of arm 35 intersects margin line 23 regardless of the position of bracket 34 on base member 28. It is also seen that the upper edge 60 of arm 35 lies in the same vertical plane as the pivotal axis thereof. Accordingly when arm 35 is moved to a vertical position, as shown in Fig. 7, the upper edge 60 thereof coincides with margin line 23.

In order to prevent movement of arm 35 when the calculating device is not being used, a latch mechanism is provided therefor. As shown more particularly in Figs. 1, 5 and 7, the upper end of base member 28 has extending to the right thereof a hook 63 which is adapted to receive a stud 64 secured to and extending upwardly from arm 35 near the outer end thereof. In order to secure arm 35 against movement, bracket 34 is first moved downwardly until bolt 37 approaches the lower end of slot 29. Arm 35 is then swung to a vertical position. Bracket 34 is then moved upwardly until stud 64 engages hook 63, as shown in Fig. 7. Nut 40 is then tightened to prevent downward movement of bracket 34 and the parts thus remain in latched position.

To operate the calculating device 9, supposing it is desired to determine the ratio between the tasks projected in standard hours and those projected in actual hours for the employee "Joe Jones" listed at the top of control sheet 8, as shown in Fig. 4, let us assume that "Jones" is a ten-hour man, i. e., he is capable of doing ten standard hours of work in an eight hour period. A line representing ten hours accordingly is projected on line 20 opposite his name. Let us also assume that the task assigned to "Jones" is one which according to the production control records requires eight standard hours of work. A line representing eight hours accordingly is projected on line 21. Now in order to determine the exact time that Jones will finish the task assigned, or the degree of completion thereof at any time during the work period, bracket 34 is first adjusted vertically, and arm 35 is then swung about its pivot 47 to the position indicated at A in Fig. 4, wherein the upper edge 60 thereof passes through the points of intersection of vertical line 25 marked (10) and horizontal line 20 and of vertical line 25 marked (8) and horizontal line 21. When arm 35 has been so adjusted, nut 40 is tightened to prevent movement of bracket 34 and consequently of arm 35 out of adjusted position. Now to enable the foreman to determine, without mathematical calculation, the time at which Jones will finish the task, requiring eight standard hours, he swings arm 35 upwardly to the position B, wherein the upper edge 60 passes through the point of intersection of the vertical line 25 marked (8) and horizontal line 20. It will be noted that edge 60 now intersects line 21 at a point four-tenths of a space beyond the vertical line 25 marked (6). Accordingly, Jones will finish the task assigned in six and four-tenths hours. Should it be desired to determine the degree of completion of the task at the end of four hours, arm 35 is swung to the position C, shown in broken lines in Fig. 4, wherein the upper edge 60 passes through the point of intersection of vertical line 25 marked (4) and horizontal line 21. It will be noted that the edge 60 now passes through the point of intersection of the fifth vertical line 25 and horizontal line 20. Accordingly, at the end of four hours, Jones has, or will have, completed five standard hours of work on the task assigned to him. Should it be desired to determine the degree of completion of the task at the end of two hours, the foreman swings arm 35 to the position D, shown in broken lines, wherein the upper edge 60 thereof passes through the point of intersection of the second vertical line 25 and horizontal line 21. The edge 60 for this position of arm 35 intersects horizontal line 20 at a point midway between the second and third vertical lines 25. Accordingly, at the end of two hours Jones has, or will have, completed two and one-half standard hours of work on the task. It, therefore, is seen that the foreman may readily determine at any time during the work period, without mathematical calculation, the degree of completion of the various tasks assigned to his employees.

Should, for example, "Joe Jones" be capable of performing less than eight standard hours of work in an eight hour period, the operation of the calculating device 9 is substantially the same as in the example just described wherein he performed more than eight standard hours of work in an eight hour period. Let us assume that "Joe Jones" is capable of performing only six standard hours of work in an eight hour period. Let us also assume that a task requiring eight standard hours has been assigned to "Jones." Bracket 34 is now moved upwardly and arm 35 is swung downwardly until the upper edge 60 thereof passes through the point of intersection of vertical line 25 marked (6) and horizontal line 20 and of vertical line 25 marked (8) and horizontal line 21. Now to determine when the task will be completed, arm 35 is swung upwardly until the upper edge 60 thereof passes through the point of intersection of vertical line 25 marked (8) and line 20. The point of intersection of edge 60 and line 21 will indicate the time at which the task would be completed, which will be found to be ten and two-thirds hours. Other proportions between the tasks projected in standard hours and those projected in actual hours may be readily obtained by swinging pivot arm 35 about its pivot across lines 20 and 21 as previously described.

In order that the calculating device 9 may be applied to all the employees listed on control sheet 8, it may be moved to the position shown in Fig. 2, when applied to the groups of lines 20, 21 and 22 disposed near the lower end of the sheet, and to the position shown in Fig. 3 for the groups of lines near the upper end of the sheet when the tasks projected in standard hours for any employees are less than the tasks projected in actual hours.

In order to position the calculating device 9, as shown in Fig. 2, it is first disengaged from rings 5, 6 and 7 by urging it to the right against the action of springs 56, 57 and 58. Slots 53 and 54 are then brought into alignment with rings 6 and 7 respectively, and base member 28 is then moved to the left until it assumes the position shown in Fig. 2. In order to position calculating device 9, as shown in Fig. 3, it is first disengaged from the rings 5, 6 and 7, as aforesaid. Slots 54 and 55 are then brought into alignment with rings 5 and 6 respectively, and base member 28 is then moved to the left against the action of springs 57 and 58 until it assumes the position shown in Fig. 3.

The examples just given simply illustrate one important use of the invention, it being apparent that the invention is adapted for wide and varied use. For example, the invention may be used to advantage in schools and colleges. When so used the students in a class are listed in spaces 19. The number of units of study that each student is capable of completing during a semester or other period based upon his intelligence quotient is projected on lines 20. All courses of instruction such as history, algebra and economics may obviously be broken down into units of work, and the example now described relates to one such course of instruction. The lines 21 have projected thereon the duration of the course of instruction, such as a semester or other period, broken down if desired into shorter periods. The matter projected on lines 21 accordingly is the same for each student listed. As an alternative, lines 21 may have average or standard units for a given course projected thereon. The actual performance of each student based on examinations and daily class work is projected on lines 22. A complete visible record of all students is thus made available to the instructor or supervisor. By applying the device 9 to lines 20 and 21, as previously described, the instructor may readily ascertain without mathematical calculation the ratio between the data projected in lines 20 and 21 at any point over the lengths thereof. The instructor or supervisor may thus determine the amount of work performed or expected to be performed by each student at any time during the semester or other period, and may assign additional work to students having higher intelligence quotients at the proper times during said semester. While all students cover broadly the same course of instruction additional work may be assigned to students at different periods during a semester depending upon their intelligence ratings. In this way, all students will be assigned the proper amount of work based upon their respective intelligence ratings.

An example of a still further use of the invention is in the determination of the relative positions of ships or aeroplanes traveling over parallel course, but at different rates of speed, at anytime during the periods projected on the parallel lines.

The invention may also be employed to effect multiplication and division as will appear more fully hereinafter.

The operation of calculating device 9 is based on the well-known theory of mathematics that where the corresponding angles of two or more right triangles are equal, the corresponding sides thereof are proportional. Such triangles are known as similar triangles. It is also well-known that where the length of one of the corresponding sides of each of two or more similar right triangles remains constant in length and the lengths respectively of the hypothenuse and the other sides thereof vary, as by swinging the hypothenuse about one of the points of intersection thereof with the other two sides, the corresponding sides of one such group of similar triangles are in the same proportion as the corresponding sides of another such group of similar triangles. It will be observed that all of the angles formed by the intersection of edge 60 of arm 35 and horizontal lines 20, 21 and 22 are equal. The angles formed by the intersection of edge 60 and margin 23 is also common to the triangles formed by edge 60, lines 20, 21 and 22, and margin line 23.

By swinging arm 35 about its pivot 47, the sides of the similar right triangles formed by margin line 23 remain constant. The hypothenuse of the right triangles formed by the edge 60 of arm 35 and the other sides thereof formed by the intersection of edge 60 and lines 20, 21 and 22, however, vary in length each time arm 35 is so moved.

Thus by arranging the upper edge 60 of arm 35 so that it passes through two definite points on lines 20 and 21 respectively and by thereafter adjusting arm 35 to any position on one of said lines, the result is accurately indicated on the other. It therefore is seen that for the positions A, B, C and D of arm 35 it follows that 10/8 equals 8/6.4 equals 5/4 equals 2.5/2.

By following this general procedure in a manner which will now be described the invention may be utilized to perform, mechanically, multiplication and division. For example, supposing it is desired to divide eight by four, the operator first adjusts bracket 34 and arm 35 so that the edge 60 of the latter passes through the points of intersection of the eighth vertical line 25 from margin 23 and a line 20 and of the fourth vertical line 25 and a corresponding line 21. Bracket 34 is now secured in position, and arm 35 is then swung upwardly until edge 60 passes through the point of intersection of the first vertical line 25 from margin 23 and the said line 21. The quotient will be indicated at the point of intersection of edge 60 and line 20 and will be found to be two. The theory of this operation, it will be seen, consists of reducing either the numerator or the denominator of one of the ratio factors to unity. Thus 8/4 equals 2/1 the quotient in this case being two.

In order to multiply two numbers the reverse of the operation just described is followed. Supposing it is desired to multiply two by four, the operator first adjusts bracket 34 and arm 35 so that the edge 60 of the latter passes through the point of intersection of a line 21 and the first vertical line 25 from margin line 23 and of the second vertical line 25 and the corresponding or associated line 20. Bracket 34 is now secured in position and arm 35 is swung downwardly until the edge 60 thereof passes through the point of intersection of the fourth vertical line 25 from margin line 23, and the previously referred to horizontal line 21. The result will be indicated at the point of intersection of line 20 and edge 60 which will be found to be eight. It therefore is seen that the theory of operation employed in multiplication also consists of reducing either numerator or the denominator of one of the ratio factors to unity, it following that ½ equals ⅘, the result in this example being eight.

From the foregoing description it is clear that multiplication and division may be rapidly and accurately performed by the use of the present invention. To facilitate reading of the results the spaces between vertical lines 25 may be subdivided or graduated. This obviously may be done without departing from the invention.

Fig. 6 illustrates a modified means of releasably retaining bracket 34 on base member 28. As shown therein, a stud 66 extends through the slot 29 and opening 38 provided respectively in base member 28 and bracket 34. The upper surface 67 of the lower head 68 of stud 66 is serrated or otherwise roughened and abuts the under surface 42 of base member 28. A coil spring 69 surrounds the upper end of stud 66 and extends between a washer 70 loosely mounted on said stud and the upper head 71 thereof. Fig. 6 shows the parts in normal holding position. To release the parts, stud 66 is simply moved downwardly against the action of spring 69, thereby also moving the head 68 out of engagement with the lower surface 42 of base member 28. Bracket 34 may now be moved along the upper surface 36 of base member 28 to properly adjust arm 35, as previously described. Upon release of stud 66, spring 69 returns the parts to the position shown in Fig. 6, whereby further movement of bracket 34 is prevented.

Fig. 7 illustrates a calculating device 9' of a modified construction. Instead of having transverse slots provided in the base member 28' thereof, the latter is provided with apertures 73. Accordingly, to attach the calculating device 9' to the binder 1, the rings thereof are opened in the usual fashion and the base member is then attached thereto, as shown in Fig. 7.

Fig. 8 shows the invention applied to a flat rectangular board 75, such as an ordinary drawing board. Board 75 has two rows of spaced studs 76 and 77 provided on one side thereof for receiving corresponding openings 78 and 79 respectively provided near the left and right hand edges 80 and 81 of each control sheet 82. Two rows of spaced studs 83 and 84 are provided at the other side of board 75 for also receiving the sheets 82, whereby two sheets may be arranged in side by side relation for comparison. Calculating device 85 is similar to calculating device 9' shown in Fig. 7, and comprises a base member 86 having a series of openings 87 provided thereon for receiving the studs 76. Base member 86 also has a bracket 88 slidably mounted thereon. An arm 89, similar to the arm 35 previously described, is pivotally mounted on bracket 88. Eye screws 90 and 91 are provided in the upper edge 92 of board 1 to enable attachment of the board on a wall, if it is so desired. The outer rows of studs 77 and 83 may be dispensed with if it is so desired, especially when board 75 is arranged in other than a vertical position.

From the foregoing description it is seen that simplified and highly useful calculating devices have been provided, which enable certain calculations to be made mechanically without resorting to mathematical calculations. It is apparent that the invention is adapted for use in multiplication and division and for a wide usage wherein the comparative data available may be projected on parallel lines. Instead of using the edge 60 of arm 30 to indicate the ratio between the data projected on the parallel lines 20, 21 and 22, a longitudinal slot may be provided in said arm, or the arm may be constructed of transparent material and a longitudinally extending hairline employed for that purpose, without departing from the invention. It is also apparent that certain other changes in structure of the devices may be made without departing from the invention.

Accordingly while the embodiments, herein shown and described, are admirably adapted to fulfill the objects primarily stated, it is to be understood that it is not intended to limit the invention thereto, since it may be embodied in

What is claimed is:

1. In a device of the class described, the combination of a sheet having one or more groups of parallel lines provided thereon on which comparative data may be projected, relatively flat supporting means for said sheet, retaining means for said sheet provided on said supporting means, and means attached to said retaining means for mechanically indicating the ratio between the data projected on said parallel lines at any point over the length thereof, said last mentioned means comprising an elongated base member having a longitudinally extending slot provided therein, a bracket slidably supported on said base member, and an arm pivotally supported on said bracket and extending across said parallel lines for indicating the ratio between the data projected thereon at any point over the length thereof.

2. In a device of the class described, the combination of one or more record control sheets having one or more groups of parallel lines provided thereon on which comparative data may be projected, a binder comprising a backing member and top and bottom covers, spaced split rings secured to said backing member for removably retaining said sheets in said binder, means attached to said rings for mechanically indicating the ratio between the data projected on said parallel lines at any point over the length thereof, said last mentioned means comprising an elongated base member having a longitudinally extending slot provided therein, a bracket slidably supported on said base member, and an arm pivotally supported on said bracket and extending across said parallel lines for indicating the ratio between the data projected thereon at any point over the length thereof.

3. In a device of the class described, the combination of one or more record control sheets having one or more groups of parallel lines provided thereon on which comparative data may be projected, a binder comprising a backing member and top and bottom covers, spaced split rings secured to said backing member for removably retaining said sheets in said binder, means attached to said rings for mechanically indicating the ratio between the data projected on said parallel lines at any point over the length thereof, said last mentioned means comprising an elongated base member having a longitudinally extending slot provided therein, a bracket slidably supported on said base member, an arm pivotally supported on said bracket and extending across said parallel lines for indicating the ratio between the data projected thereon at any point over the length thereof, means for securing said bracket in any position of adjustment along said base member and latch means for retaining said arm in one position of adjustment.

4. In a device of the class described, the combination of one or more record control sheets having one or more groups of parallel lines provided thereon on which comparative data may be projected, a binder comprising a backing member and top and bottom covers, spaced split rings secured to said backing member for removably retaining said sheets in said binder, means attached to said rings for mechanically indicating the ratio between the data projected on said parallel lines at any point over the length thereof, said last mentioned means comprising an elongated base member having a longitudinally extending slot provided therein, a bracket slidably supported on said base member, an arm pivotally supported on said bracket and extending across said parallel lines for indicating the ratio between the data projected thereon at any point over the length thereof, means for securing said bracket in any position of adjustment along said base member, latch means for retaining said arm in one position of adjustment, and said base member having a plurality of spaced apertures provided therein adapted to receive said rings to secure said base member in position in said binder.

5. In a device of the class described, the combination of one or more record control sheets having one or more groups of parallel lines provided thereon on which comparative data may be projected, a binder comprising a backing member and top and bottom covers, spaced split rings secured to said backing member for removably retaining said sheets in said binder, means attached to said rings for mechanically indicating the ratio between the data projected on said parallel lines at any point over the length thereof, said last mentioned means comprising an elongated base member having a longitudinally extending slot provided therein, a bracket slidably supported on said base member, an arm pivotally supported on said bracket and extending across said parallel lines for indicating the ratio between the data projected thereon at any point over the length thereof, means for securing said bracket in any position of adjustment along said base member, latch means for retaining said arm in one position of adjustment, said base member having a series of transverse slots provided along one edge thereof for receiving said rings, and resilient means mounted adjacent each of said slots for engaging said rings to resiliently hold said base member in position in said binder.

6. In a device of the class described, the combination of a record sheet having one or more groups of parallel lines provided thereon on which comparative data may be projected, a margin line intersecting said groups of parallel lines at right angles at one end thereof, a flat supporting member, spaced retaining means on said supporting member for retaining said sheet in position, and means for mechanically indicating the ratio between the data projected on said parallel lines at any point over the length thereof, said last mentioned means comprising a base member, a bracket slidably mounted on said base member, an arm adapted to extend across said groups of parallel lines, means for pivotally supporting said arm on said bracket, guide means for said bracket whereby upon movement of said bracket over said base member the pivotal axis of said arm overlies said margin line, and a straight edge on said arm lying in a vertical plane intersecting the said pivotal axis of said arm.

7. In a device of the class described, the combination of one or more record control sheets having one or more groups of parallel lines provided thereon, one of said parallel lines in each group adapted to have tasks projected thereon in standard hours, a second line of each group adapted to have tasks projected thereon in actual hours, and a third line in each of said groups adapted to have indicated thereon performance in actual hours, a relatively flat supporting member for said sheets, spaced retaining means provided on said supporting means for retaining said sheets in position thereon, and means for mechanically indicating the ratio between the data projected on the said parallel lines in each of said groups, said last mentioned means comprising an elongated base member, a bracket slidably supported on said base member, an arm pivotally supported on said bracket and adapted to extend across said groups of parallel lines to indicate the ratio between the data projected on one of said lines with respect to that projected on the others at any point over the length thereof, means for securing said bracket in any position of adjustment, latch means for retaining said lever in one position of adjustment, and means for detachably securing said base member to said retaining means.

8. In a device of the class described, the combination of one or more record control sheets having one or more groups of parallel lines provided thereon, one of said parallel lines in each group adapted to have tasks projected thereon in standard hours, a second line of each group adapted to have tasks projected thereon in actual hours, and a third line in each of said groups adapted to have indicated thereon performance in actual hours, a binder comprising a backing member and top and bottom covers, spaced split rings secured to said backing member for removably retaining said sheets in said binder, and means for mechanically indicating the ratio between the data projected on the said parallel lines of each of said groups at any point over the lengths thereof, said last mentioned means comprising a base member, means for detachably securing said base member to the said rings of said binder, a bracket slidably supported on said base member, an arm having a straight edge adapted to extend across said groups of parallel lines, means for pivotally supporting said arm on said bracket, means for securing said bracket against movement along said base member, and latch means for said arm for retaining it in one position of adjustment.

BENEDICT D. KAHAN.

REFERENCES CITED

The following references are of record in the file of this patent:

UNITED STATES PATENTS

| Number | Name | Date |
|---|---|---|
| 280,772 | Tucker et al. | July 3, 1883 |
| 860,662 | Herbert | July 23, 1907 |
| 896,614 | Benedict | Aug. 18, 1908 |
| 1,040,592 | Thomas | Oct. 8, 1912 |
| 1,065,624 | Peters | June 24, 1913 |
| 1,074,439 | Kincaid | Sept. 30, 1913 |
| 1,091,872 | Trick | Mar. 31, 1914 |
| 1,172,010 | Cooke | Feb. 15, 1916 |
| 1,332,159 | Buck | Feb. 24, 1920 |
| 1,553,683 | Furbish | Sept. 15, 1925 |
| 1,575,911 | Gomez | Mar. 9, 1926 |
| 1,819,429 | Manzler | Aug. 18, 1931 |
| 2,078,138 | Hansen | Apr. 20, 1937 |

FOREIGN PATENTS

| Number | Country | Date |
|---|---|---|
| 49,960 | Sweden | Sept. 18, 1915 |
| 117,278 | Great Britain | July 10, 1918 |
| 320,190 | Germany | Apr. 12, 1920 |

OTHER REFERENCES

"The Construction of Graphical Charts," by John Peddle, published in 1919 by McGraw-Hill Book Co., New York (pages 2 and 3).

"Graphical and Mechanical Computation," by Joseph Lipka, published by John Wiley and Sons, Inc., New York, in 1918 (pages 44–46).